S. P. TIERNEY.
ROTARY INTERNAL COMBUSTION ENGINE.
APPLICATION FILED JAN. 22, 1916.
1,216,184. Patented Feb. 13, 1917.
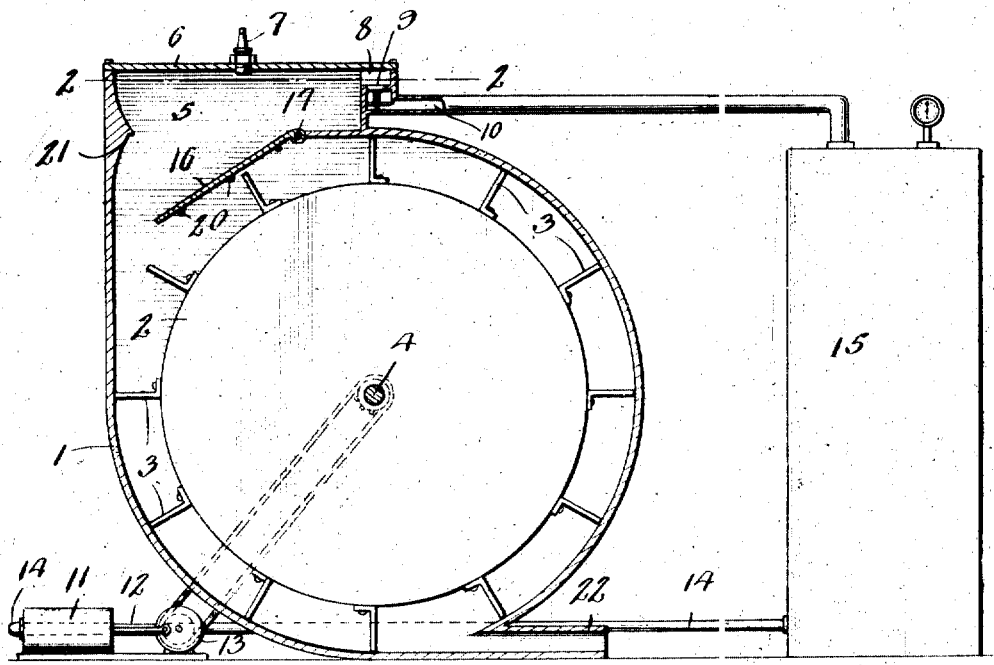
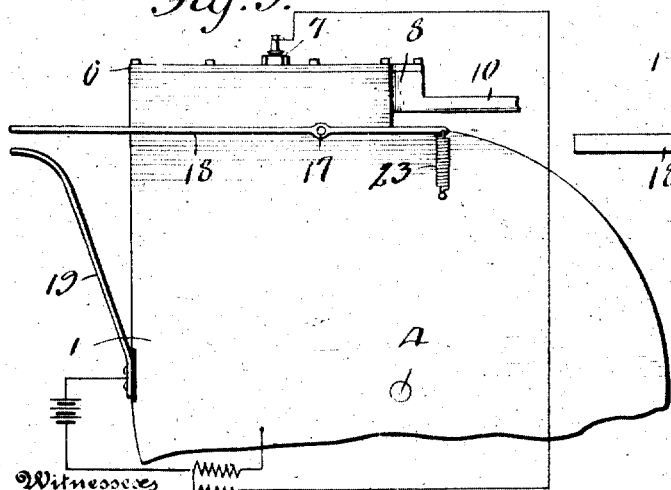
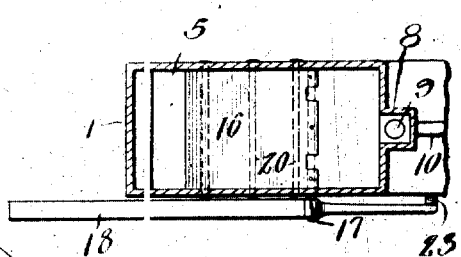
Inventor
S. P. Tierney,
By Victor J. Evans
Attorney

UNITED STATES PATENT OFFICE.

SHELBY P. TIERNEY, OF METCALF, ARIZONA.

ROTARY INTERNAL-COMBUSTION ENGINE.

1,216,184.   Specification of Letters Patent.   Patented Feb. 13, 1917.

Application filed January 22, 1916. Serial No. 73,709.

*To all whom it may concern:*

Be it known that I, SHELBY P. TIERNEY, a citizen of the United States, residing at Metcalf, in the county of Greenlee and State of Arizona, have invented new and useful Improvements in Rotary Internal-Combustion Engines, of which the following is a specification.

This invention relates to rotary internal combustion engines, the object in view being to produce a simple, efficient and powerful light weight engine of the class referred to which embodies in connection with a rotor having blades, a rotor chamber, an explosion or combustion chamber, and a valve controlling the communication between the explosion and rotor chambers and also acting as a circuit closer for the ignition system, the arrangement being such that the valve opens to admit the carbureted air under pressure from the explosion chamber to the rotor chamber and simultaneously a spark is created in the explosion chamber by the closing of the ignition circuit effected by the opening movement of said valve.

With the above and other objects in view, the invention consists in the novel construction, combination and arrangement of parts, as herein described, illustrated and claimed.

In the accompanying drawings:—

Figure 1 is a vertical longitudinal section through an engine embodying the present invention.

Fig. 2 is a horizontal section on the line 2—2 of Fig. 1 looking downwardly.

Fig. 3 is a fragmentary side elevation of the engine.

The present invention contemplates the use of a stationary rotor casing 1 in which there is arranged a rotor the body of which is represented at 2, said rotor being provided on the periphery thereof with blades 3 which preferably extend in a radial direction with respect to the shaft 4 of the rotor, said shaft being journaled in the opposite heads of the rotor casing.

The rotor casing 1 is extended to form an explosion or combustion chamber 5 through the head 6 of which extends an igniter 7 shown in the form of a spark plug. The explosion chamber also has associated therewith an inlet valve chamber 8 in which is arranged an automatic inlet valve 9, 10 designating the intake pipe for the carbureted air which is forced through the intake 10 and past the valve 9 into the explosion chamber 5 under pressure by means of an air compressor shown as embodying a cylinder 11 containing a piston, the connecting rod 12 of which is actuated by a crank wheel 13 driven by the rotor or its shaft. From the air compressor, a pipe 14 carries the compressed air into a pressure tank 15 containing gasolene or other liquid fuel, 10 representing the pipe which leads from the pressure tank 15 to the engine and forms the engine intake pipe.

The main valve is indicated at 16 and when closed, serves to cut off communication between the explosion chamber 5 and the rotor chamber formed by the casing 1. The valve 16 may be perfectly flat as shown and is mounted in fixed relation to a valve stem or shaft 17 which is journaled in openings in the opposite side walls of the explosion chamber and which projects at one end beyond said chamber where it has fastened thereto a circuit closing arm 18 which is movable into and out of contact with a circuit contact finger 19 forming the other terminal of an electrical ignition circuit by means of which a spark is created at the inner end of the igniter plug 7 just as the valve 16 opens to allow the charge of carbureted air under pressure to enter the rotor chamber. The opening movement of the valve 16 is limited by one or more stops 20. The free end of the valve 16 comes in contact with or seats against an extension 21 at the junction of the explosion chamber 5 and the rotor chamber. 22 represents the exhaust pipe which leads off tangentially from the rotor casing at a point about diametrically opposite from the explosion chamber 5.

In operation, the carbureted air, gas or the like is forced by predetermined pressure derived from the pressure tank through the intake pipe 10 into the explosion or combustion chamber 5 where it is trapped between the inlet valve 9 held for example under ten pounds pressure and the main valve 16. When the pressure becomes sufficiently high to overcome the spring 23, the valve 16 is caused to open thereby bringing the contact arm 18 against the contact finger 19 and closing the circuit of the ignition system. This produces a spark in the explosion chamber, the charge is ignited and in expanding closes the intake valve 9 and presses against the blades of the rotor imparting a rotary motion to the latter.

The valve 16 when the pressure is sufficiently reduced is then automatically closed by means of a spring 23 which holds said valve closed until a certain predetermined pressure is again obtained in the chamber 5, whereupon the operation just above described is repeated.

In further explanation of the operation of the engine, it may be stated that when the pressure in the chamber 5 falls to the pressure in the tank 15, said chamber 5 again begins to fill with fresh mixture. In view of the fact that the opening controlled by the valve 16 is quite large it is not possible to quickly fill the same by the incoming mixture passing through the pipe 9 and therefore there is not sufficient pressure to hold the valve 16 open. Just as soon as the pressure of the burned gases falls below the pressure exerted by the spring 23, the valve 16 will start to close on account of the small capacity of the pipe 9. Then when the chamber 5 is filled with mixture under compression, the spring 23 is overcome and the valve 16 swings to an open position preparatory to again igniting the mixture in the same manner and with the same result as previously described.

I claim:—

A rotary internal combustion engine embodying, in combination, a rotor provided with blades on its periphery, a stationary rotor casing, an explosion chamber arranged to discharge into the rotor casing tangentially of the rotor, a hinged valve separating the rotor casing from the explosion chamber, a valve stem bearing a fixed relation to said valve and extending through a wall of the explosion chamber, an ignition circuit-closing arm fast on said valve stem, a circuit contact in the path of said arm, and means for holding said valve closed with a predetermined pressure.

In testimony whereof I affix my signature in presence of two witnesses.

SHELBY P. TIERNEY.

Witnesses:
 D. L. BOUSE,
 ROBT. C. SMITH.